(12) United States Patent
Sutardja et al.

(10) Patent No.: US 7,583,469 B1
(45) Date of Patent: *Sep. 1, 2009

(54) UP-SAMPLED FILTERING FOR SERVO DEMODULATION

(75) Inventors: Pantas Sutardja, San Jose, CA (US); Michael B. Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 39 days.

This patent is subject to a terminal disclaimer.

(21) Appl. No.: 11/617,356

(22) Filed: Dec. 28, 2006

Related U.S. Application Data

(63) Continuation of application No. 10/682,138, filed on Oct. 9, 2003, now Pat. No. 7,158,333.

(60) Provisional application No. 60/460,633, filed on Apr. 3, 2003.

(51) Int. Cl.
*G11B 5/596* (2006.01)
*G11B 5/09* (2006.01)

(52) U.S. Cl. .............. 360/77.02; 360/77.08; 360/78.04; 360/39; 360/32

(58) Field of Classification Search .................. None
See application file for complete search history.

(56) References Cited

U.S. PATENT DOCUMENTS

| | | | |
|---|---|---|---|
| 5,267,095 A | 11/1993 | Hasegawa et al. | |
| 5,367,409 A | 11/1994 | Ottesen et al. | |
| 5,774,298 A | 6/1998 | Cheung et al. | |
| 5,825,318 A | 10/1998 | Patapoutian et al. | |
| 6,115,203 A | 9/2000 | Ho et al. | |
| 6,324,030 B1 | 11/2001 | Cheung et al. | |
| 6,738,205 B1 | 5/2004 | Moran et al. | |
| 7,158,333 B1 * | 1/2007 | Sutardja et al. | .......... 360/77.02 |

* cited by examiner

*Primary Examiner*—Andrew L Sniezek
(74) *Attorney, Agent, or Firm*—Kenyon & Kenyon LLP

(57) ABSTRACT

An apparatus, method, and system for providing a fine adjustment for transducing head positioning in a hard disk drive (HDD). The apparatus, method, and system include reading a positioning error field wherein the resulting signal is a substantially sinusoidal position error signal (PES), filtering the PES to remove low frequencies and attenuate high frequencies, sample the filtered PES at a multiple of the channel frequency, filter the higher frequency harmonics, down sample the PES, and provide a signal proportional to the amplitude of the down sampled PES. This signal is the reference signal to the head positioning servo.

35 Claims, 12 Drawing Sheets

Fig. 2 - Plan View of a Disk with Servo Arm

Prior Art

UP-SAMPLED FILTERING FOR SERVO DEMODULATION

CROSS-REFERENCE TO RELATED APPLICATIONS

This application is a continuation of U.S. application Ser. No. 10/682,138 filed Oct. 9, 2003, which claims the benefit of Provisional Application No. 60/460,633, filed Apr. 3, 2003. This application incorporates these applications by reference.

BACKGROUND OF THE INVENTION

1. Field of the Invention

This invention relates in general to the field of information storage, and more particularly to disk drive servo control systems for controlling the disk arm assembly movement across the surface of a rotating disk.

2. Description of the Related Art

Hard disk drives (HDD) typically comprise at least one disk having a magnetic medium for storing information, a spindle, a controller for controlling disk rotational speed, a transducing head (for reading and writing data), a servo actuator assembly including a positioning controller for positioning the head over the appropriate disk track, and data channels for transmitting data to and from the disk. The transducing head reads data from and writes data to the disk in data blocks having either fixed or variable length. A data block comprises a preamble (for acquiring timing signals), timing bits, a position error field, address bits, data bits, and error correction bits. Data blocks are recorded in sectors in concentric tracks. A track may comprise several sectors. The number of sectors may depend on the radial location of the track on the disk. FIG. 1 shows a typical HDD as described above. FIG. 2 shows the transducing head positioned over a data track on the disk.

Conventionally, the transducing head is mounted on an arm and the arm move across the surface of the rotating disks to access the proper track. The positioning controller directs the transducing head to the correct data track and maintains the head position to align with the centerline of the data track. The position error field consists of a prerecorded series of magnetic bit flux reversals, and when read by the transducing head provides a substantially sinusoidal position error signal (PES) with a frequency of one quarter of the baud rate. (Baud rate refers to the number of distinct events per second in a modulated signal, and in the case of a read channel, refers to the channel frequency.) The PES includes higher order harmonic frequencies. The bit pattern is typically a repetition of "11001100" known as the 2T pattern (some in the field refer to the pattern as the 4T pattern). The "T" in the 2T pattern represents the channel bit period. The recorded position error field flux transitions are spaced generally to one side or the other of the centerline of the tracks.

The servo controller demodulates the PES and uses the amplitude of the PES to position the head over the centerline of the data track. If the amplitude is above a certain level, the controller positions the head to one side of the track centerline, and if the amplitude is below a certain level, the controller positions the head to the other side.

The PES amplitude is used as an error correction signal to the servo controller and varies with the distance of the head from the centerline and with the sampling phase offset. If the position error fields are written asynchronously with the timing recovery field, there will be a sampling phase offset when the PES is demodulated. This sampling phase offset is random, and provides an additional source of PES amplitude variation.

Referring now to FIG. 3, the head reads the position error field in words of 4 bits (the 2T pattern) as the PES 301 and provides the PES along with any associated noise to an analog continuous time filter (CTF) 302 that is set in the differentiation mode. Electronic and magnetic sources contribute to the noise. The CTF, when set in the differentiation mode, has the response curve shown in FIG. 4, wherein the CTF filters any low frequencies, and attenuates frequencies higher than 0.25 of the baud rate. The ideal filter would block all energy over 0.5, but a filter having such a sharp cut-off is difficult to construct in view of the cost, size, and energy constraints in HDD read channels.

FIG. 5 shows the frequency response spectrum for the sine wave produced by the 2T pattern before filtering. This spectrum has a fundamental frequency at 0.25 baud and a third harmonic at 0.75 baud. Harmonic frequencies cause interference with the fundamental frequency when the analog signal is sampled at intervals of T because any energy outside the Nyquist band of 0 to 0.5 baud will fold back into the Nyquist band. Here the third harmonic is at 0.75 baud, and is outside the Nyquist band. Depending on the sampling phase, this out-of-band energy will either constructively or destructively interfere with the fundamental frequency. The analog-to-digital converter (ADC) 303, FIG. 3, samples the PES and the energy contained in the third harmonic reflects to the fundamental frequency, either adding to or subtracting from the energy of the fundamental frequency depending on the sampling phase offset.

A second harmonic may be present if the transducing head has a non-linear transfer function. For example, a magneto-resistive transducing head is non-linear because a positive pulse produces a different amplitude than a negative pulse. This non-linearity also affects PES amplitude variation. FIG. 6 shows the frequency response spectrum of the PES when a transducing head having 25% asymmetry is used. In this example, the second harmonic caused by the transducing head asymmetry is stronger than the third harmonic.

Referring again to FIG. 3, the CTF 302 passes the filtered PES to the ADC 303, which samples the filtered signal at the channel frequency. The ADC then passes the sampled signal to a 4-point discrete Fourier transform (DFT) 304 for producing the PES amplitude signal 305. This amplitude signal provides a position error signal to the actuator position controller. Any variation in the amplitude signal not representing an offset from the track centerline will produce a positioning error. The variation due to the sampling phase offset is such a variation. As shown in the example in FIG. 7, the output of the DFT varies by ±4.5% depending upon the sampling phase offset.

Therefore, a need exists for a method and apparatus that reduce the effects of sampling phase offset on positioning a transducing head over the centerline of a data track in an HDD.

SUMMARY OF THE INVENTION

To address the stated need and fulfill other desired objectives, in accordance with one embodiment of the invention, a position servo controller provides an ADC that samples a PES at twice the baud rate so the samples are spaced at T/2 intervals, a bandpass finite-impulse-response (FIR) filter, and a down converter to restore the signal to the original frequency. Sampling the PES at twice the baud rate has the effect of spreading the frequency lobes in the frequency domain. The FIR filter has notches at the exact frequencies of the harmonics, thereby eliminating the higher harmonics while passing the fundamental frequency.

DETAILED DESCRIPTION OF EMBODIMENTS

The inventive apparatus and method provide a PES amplitude signal for transducing head positioning, wherein the PES amplitude signal is not sensitive to the sampling phase offset. If the position error fields are recorded to a disk asynchronously with the timing recovery field, there will be a sampling phase offset when the PES is demodulated, and this offset is random.

Figure 1:
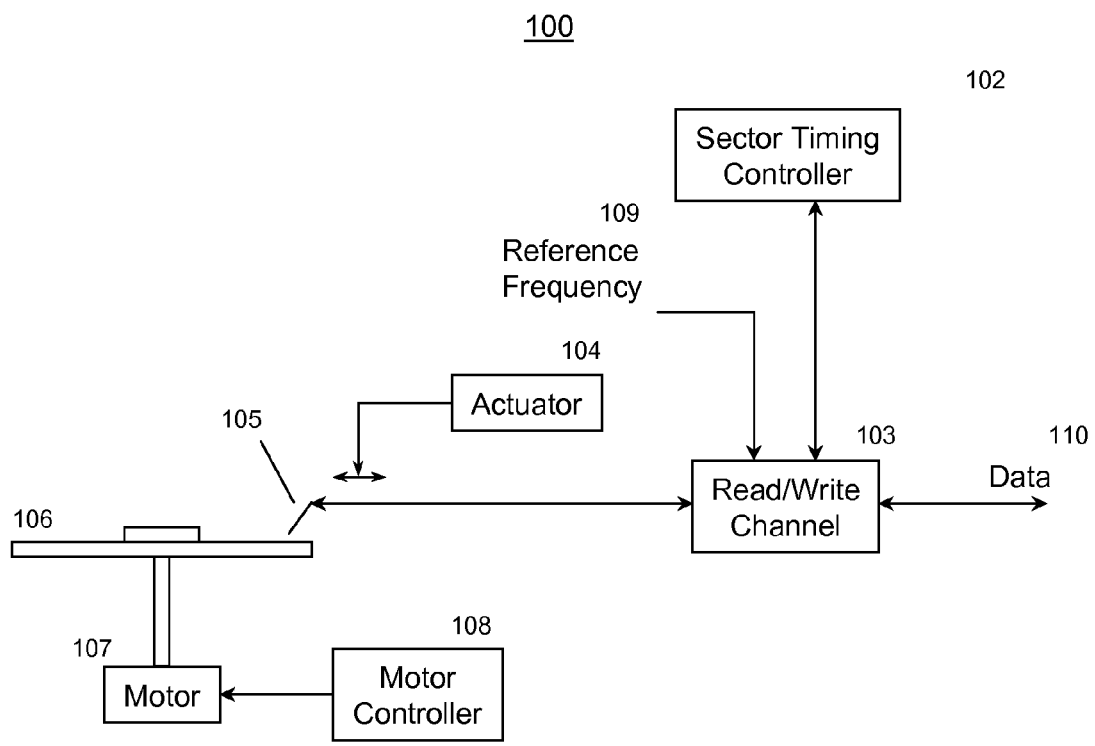
FIG. 1 is a block diagram of a typical HDD system showing the major components.

As shown in FIG. 1, a hard disk drive system 100 comprises a disk having a magnetic disk 106. The motor 107 spins the disk at a constant speed and under control of the motor controller 108. Data 110 passes through a read/write channel 103 to a transducing head 105. The servo actuator 104 positions the transducing head 105 over the proper data track, and data is transmitted to or from the read/write channel 103. A reference frequency 109 provides timing signals to the read/write channel 103. Skilled practitioners in the art will recognize that other configurations are possible.

Figure 2:
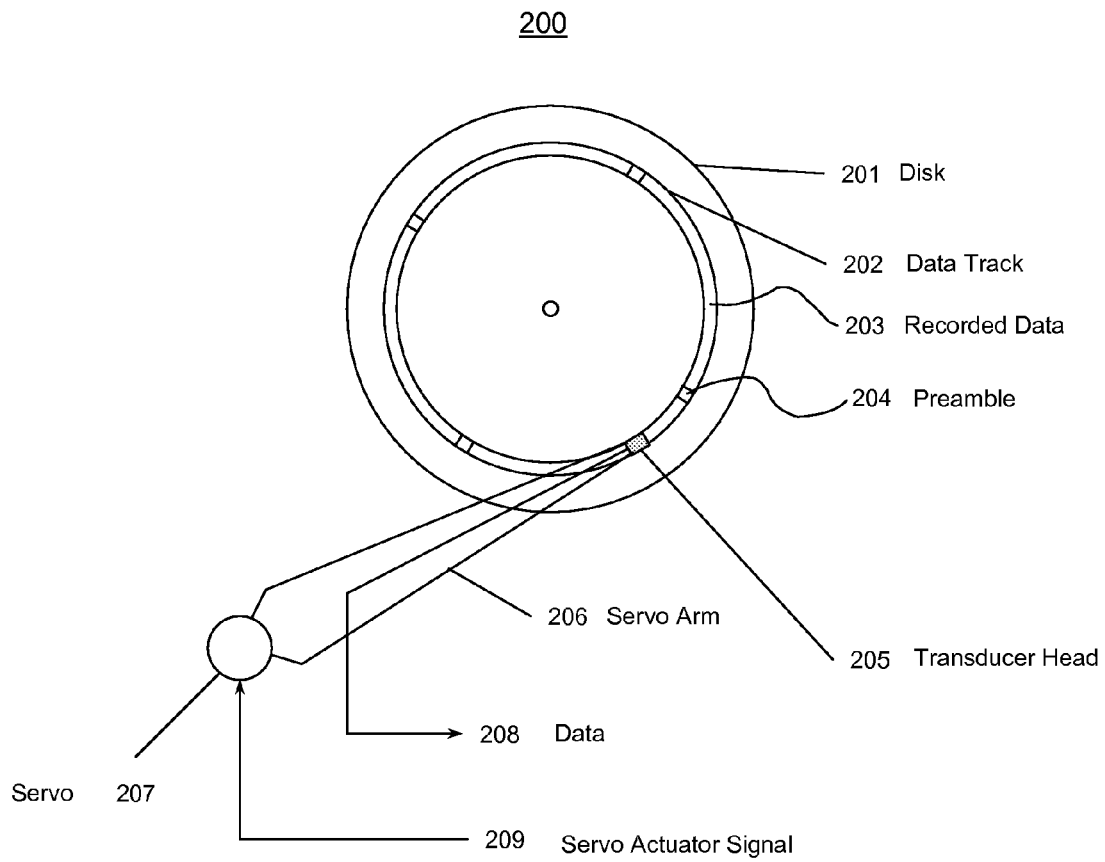
FIG. 2 shows the relationship of the head, actuator, and the servo controller.
Figure 3:
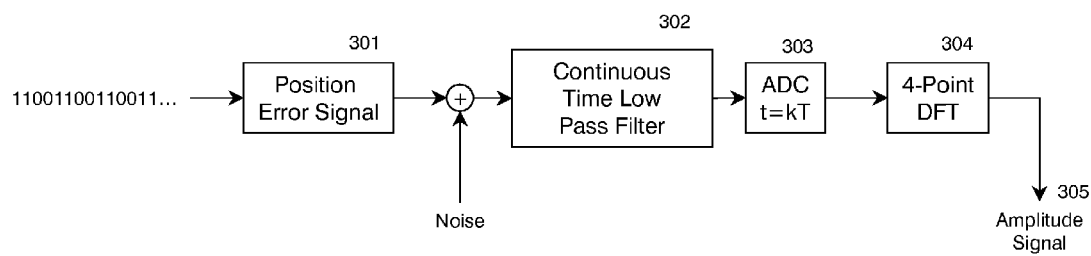
FIG. 3 shows a block diagram of the prior art for receiving a PES and providing an amplitude signal.

FIG. 2 shows a planar view of the disk surface, specifically, the relationship between the transducing head 205, the data tracks 202, the positioning arm 206, and the servo actuator 207. The transducing head 205 records data in concentric tracks 202 on a disk 201. A data track 202 has a number of sectors, each sector having a preamble 204 and data 203. The preamble 204 contains the position error field as well as other timing acquisition signals. The transducing head 205 provides the recorded data 203 and the preamble 204 to a read channel for further processing over data channel 208.

The servo actuator 207 positions the positioning arm 206 and the transducing head 205 over a data track 202 in response to a servo actuator signal 209. The servo actuator signal is an analog signal whose amplitude determines the direction and amount of the servo movement. Therefore, any noise in the servo actuator signal results in a dithering movement of the transducing head 205.

Figure 4:
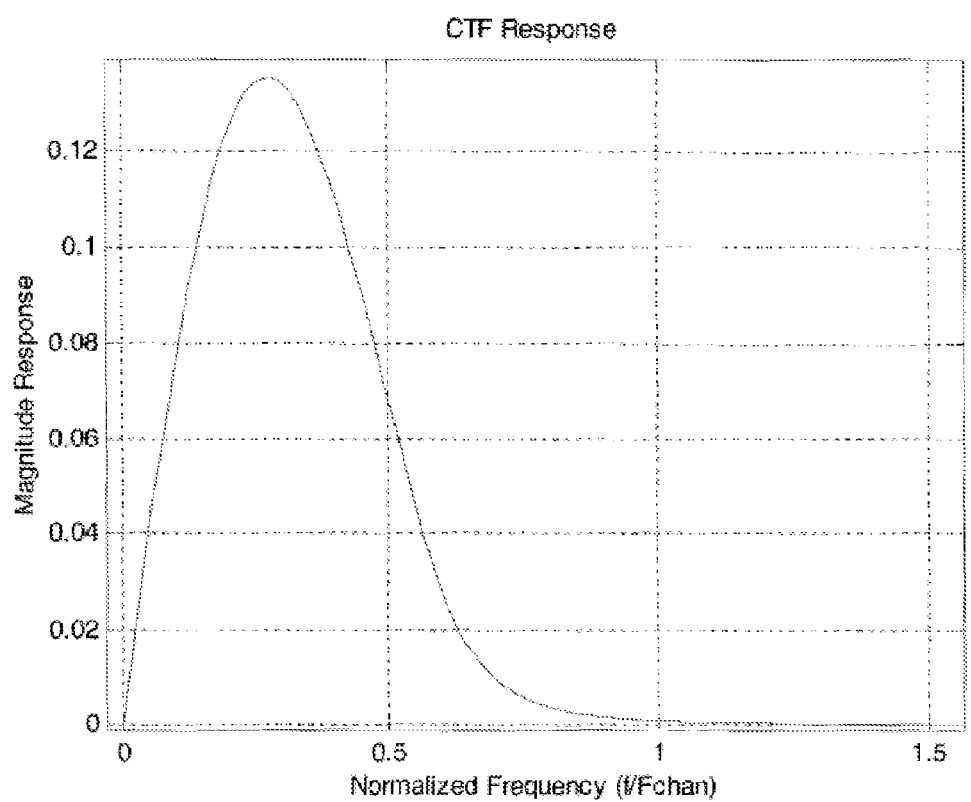
FIG. 4 shows the response curve for a continuous time filter (CTF) set in the differentiation mode with the peak frequency response adjusted to 0.25 of the channel frequency.
Figure 5:
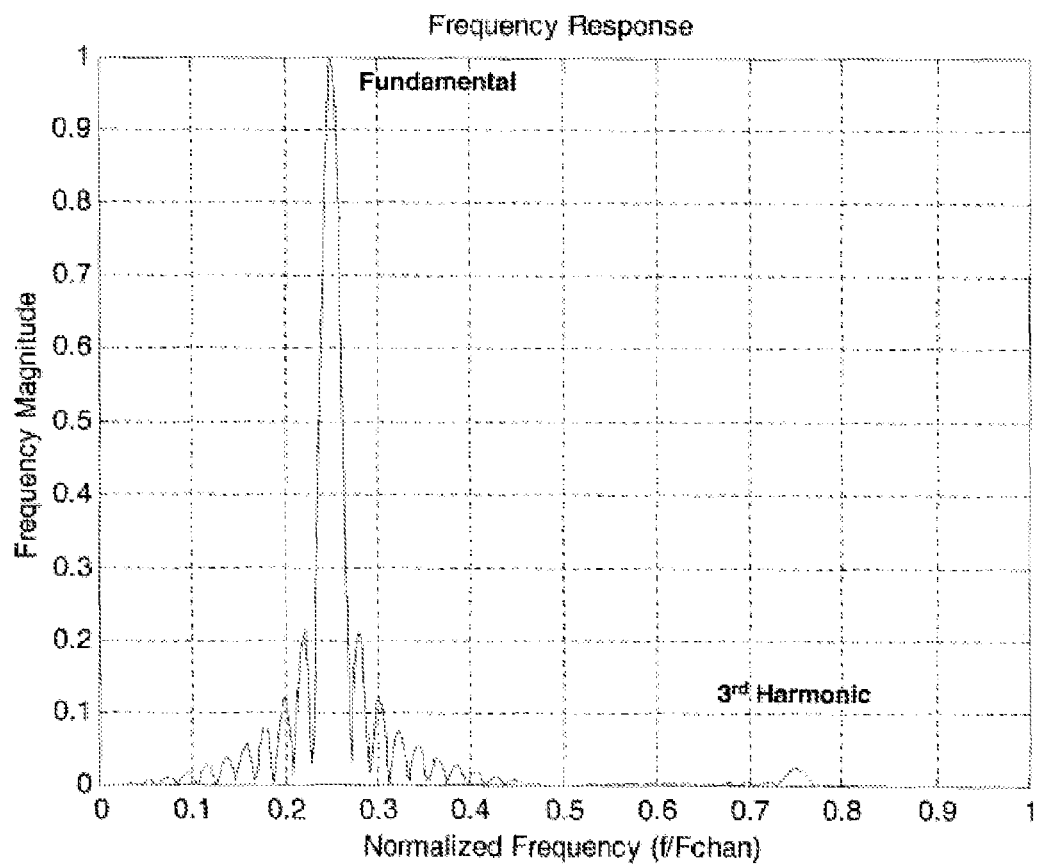
FIG. 5 presents a frequency response spectrum for the 2T pattern producing a near perfect sine wave.
Figure 6:
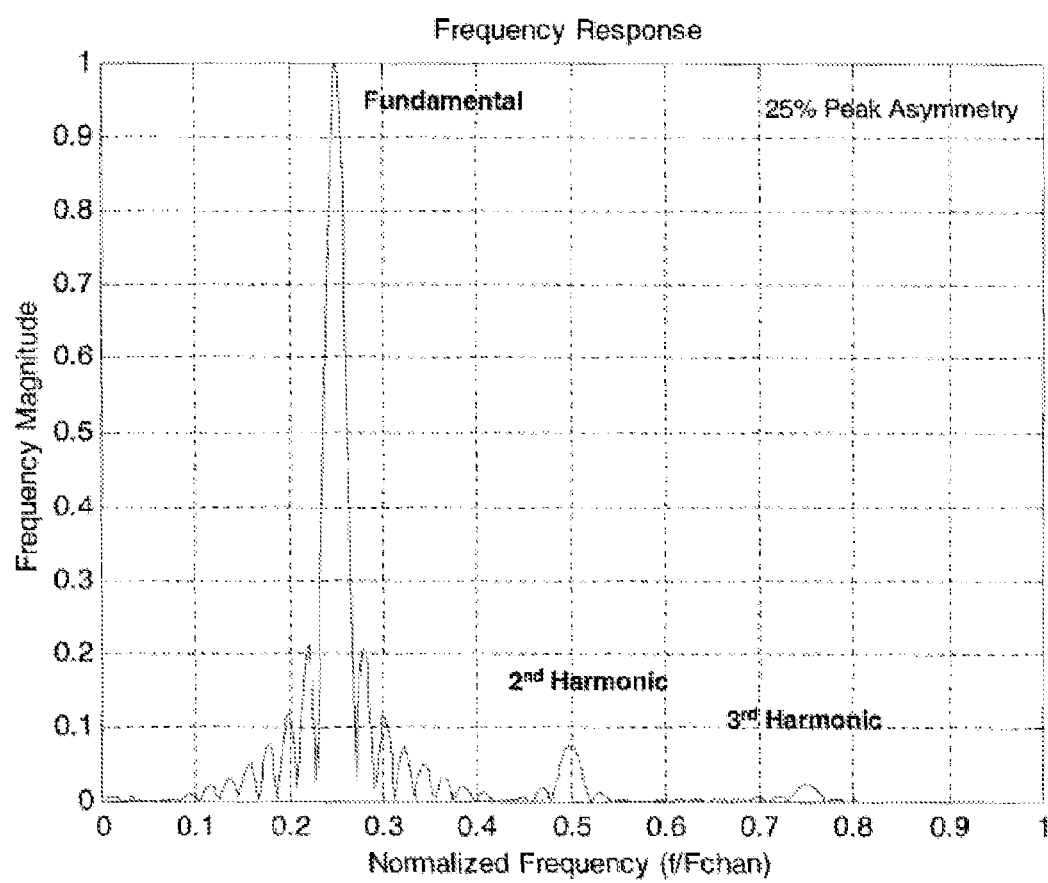
FIG. 6 shows the response spectrum for the 2T signal that is read by a transducing head having a 25% peak asymmetry.
Figure 7:
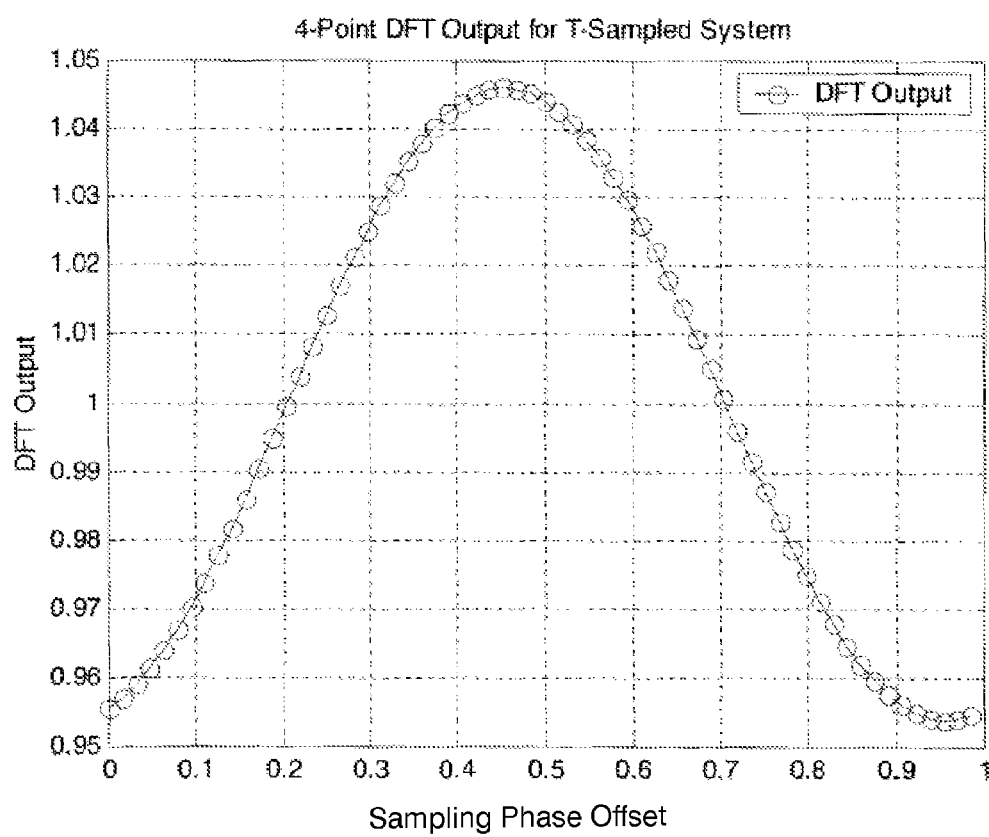
FIG. 7 displays the PES amplitude signal as a function of sampling phase offset.
Figure 8:
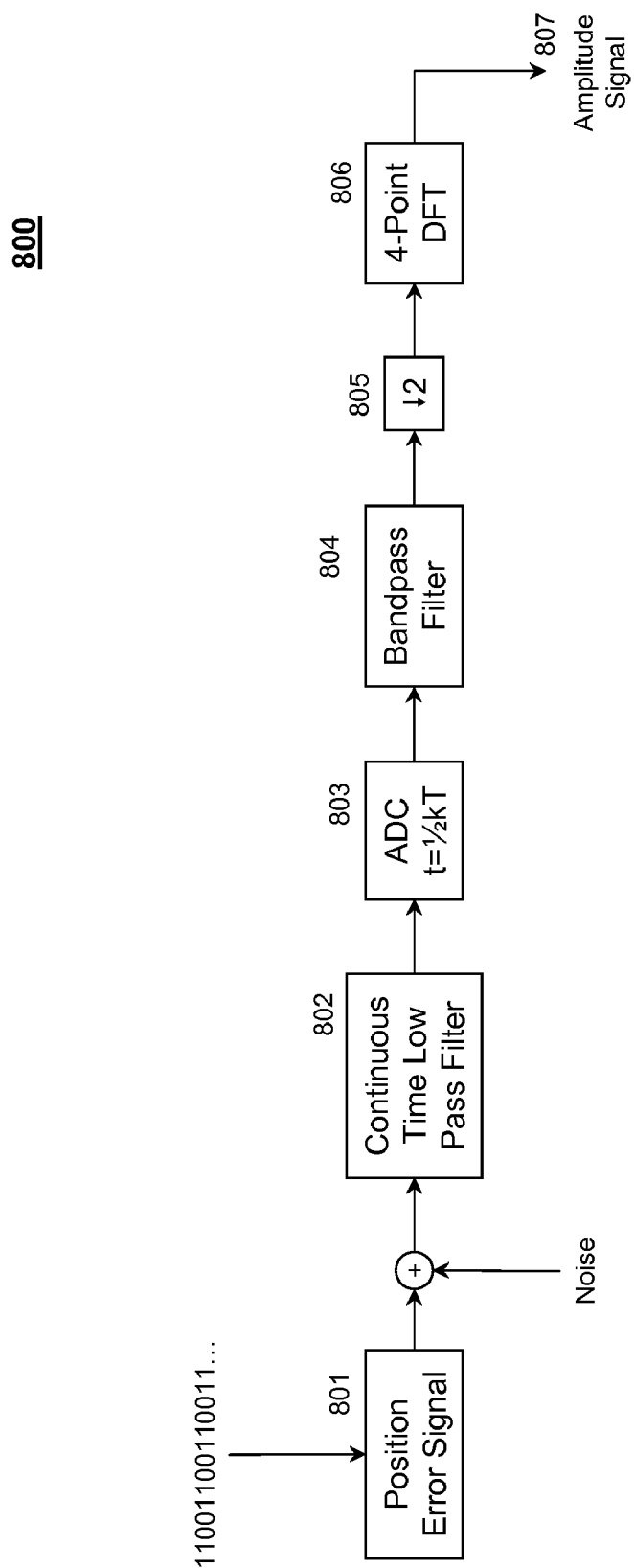
FIG. 8 is a block diagram of one embodiment of the invention, wherein the position servo controller includes an ADC sampling at twice the baud rate, a bandpass FIR, and a 2× down converter.

Referring now to FIG. 8, the transducing head reads the position error field as a position error signal 801. The PES contains a noise component originating as media and electronic noise, and is a natural part of the PES. The PES and associated noise passes to a CTF 802 that is set in the differentiation mode. The CTF has the frequency response curve shown in FIG. 4 and filters low frequencies, and attenuates frequencies higher than 0.25 baud.

An analog-to-digital (ADC) converter 803 samples the filtered PES at 2× the baud rate. This oversampling spreads the frequency response to expose the higher frequency harmonics. A bandpass filter then filters these higher frequency harmonics. The bandpass filter may be either analog or digital. One example of a digital bandpass filter is a Finite Impulse Response (FIR) filter. Another example of a digital bandpass filter is an Infinite Impulse Response (IIR) filter. Referring again to FIG. 8, the bandpass filter 804 filters the sampled signal.

In order to attenuate harmonics of the sampled signal, the bandpass filter 804 comprises two cascaded FIRs having coefficients substantially equal to $$\left[\frac{1}{\sqrt{2}}, 1, \frac{1}{\sqrt{2}}, 0, -\frac{1}{\sqrt{2}}, -1, -\frac{1}{\sqrt{2}}\right]$$

and [1, 1, 1] resulting in combined impulse response substantially equal to $$\left[\frac{1}{\sqrt{2}}, 1+\frac{1}{\sqrt{2}}, 1+\frac{2}{\sqrt{2}}, 1+\frac{1}{\sqrt{2}}, 0, \right.$$
$$\left. -\left(\frac{1}{\sqrt{2}}\right), -\left(1+\frac{1}{\sqrt{2}}\right), -\left(1+\frac{2}{\sqrt{2}}\right), -\left(1+\frac{1}{\sqrt{2}}\right)\right].$$

Figure 9:
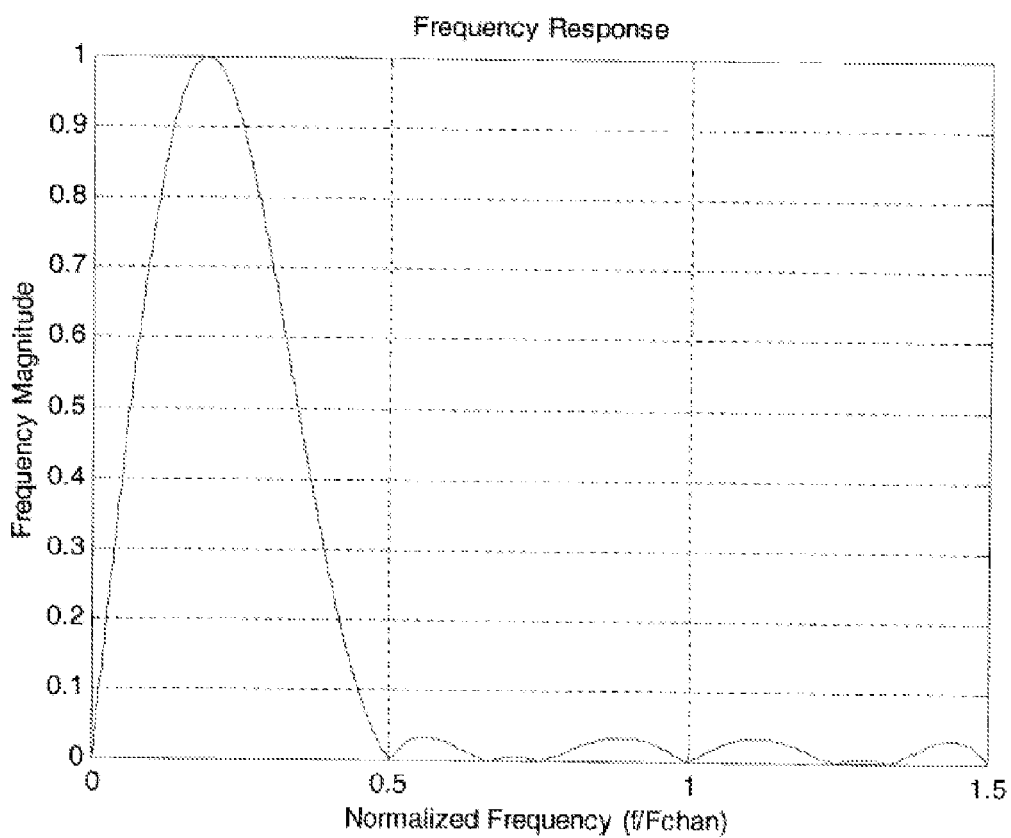
FIG. 9 shows response curve of the bandpass FIR.
Figure 10:
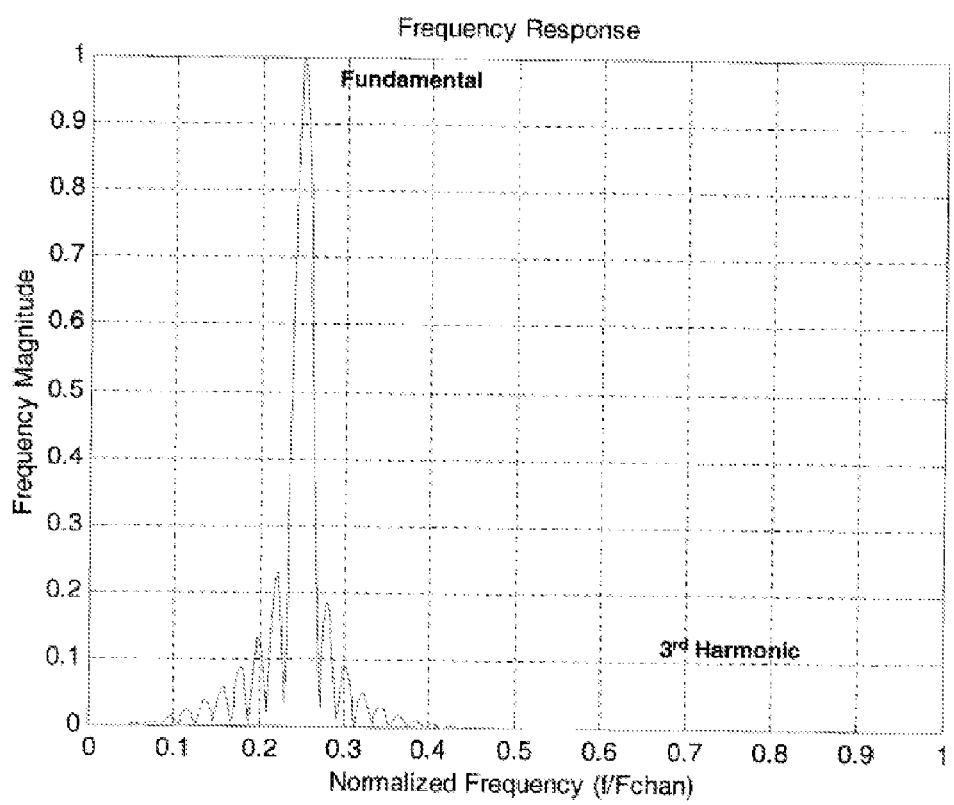
FIG. 10 displays the frequency response spectrum of the PES after filtering by the bandpass FIR.

FIG. 9 shows the response curve of the cascaded bandpass filter 804 having notches at the harmonic frequencies of the 2× sampled signal. FIG. 10 shows the results of the 2× sampled signal after passing though the bandpass filter 804. The bandpass filter 804 has removed the out-of-band energy that was contained in the harmonic frequencies.

The bandpass filter 804 may be the equivalent of cascading a sinusoidal filter with a simple filter for additional filtering. The simple filter may be a comb filter or a cascade of more than one comb filter.

Referring again to FIG. 8, the converter 805 down samples the signal and passes the down sampled signal to the discrete Fourier transform (DFT) 806 for generating the analog amplitude signal 807. This amplitude signal 807 controls the servo actuator to position the transducing head over a data track centerline.

Figure 11:
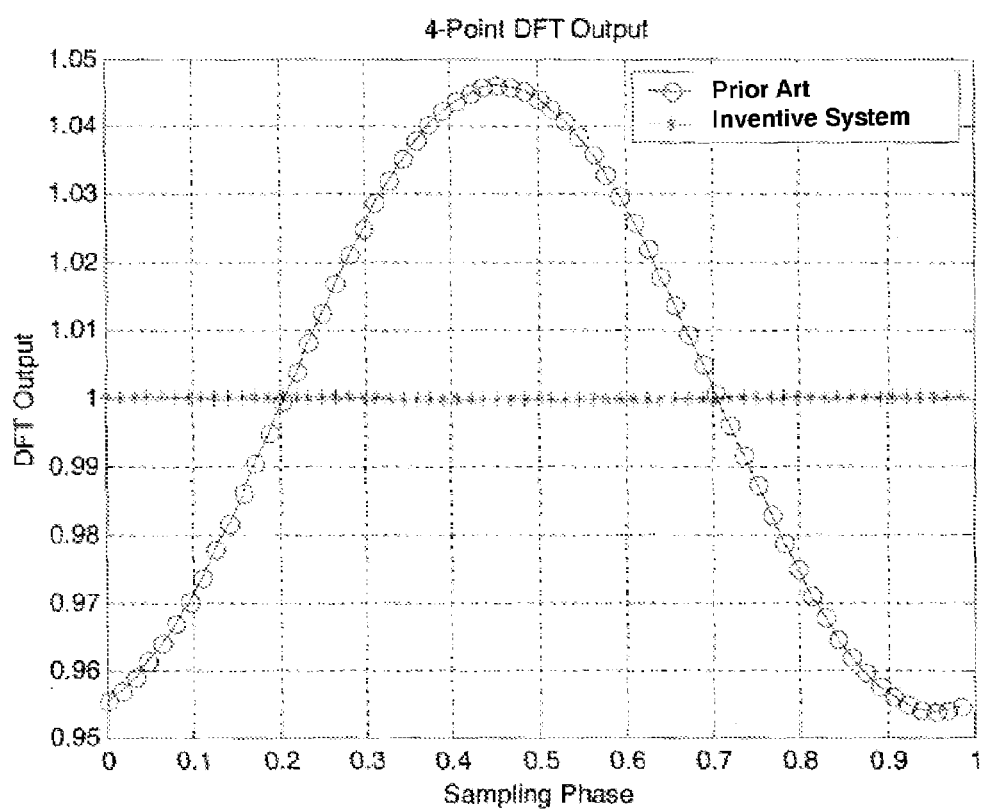
FIG. 11 is the PES amplitude signal when the PES is sampled at twice the baud rate, the higher harmonics are removed, and down sampled to the original frequency

FIG. 11 compares the PES amplitude signal of the inventive apparatus with the prior art as a function of sampling phase, showing the inventive system is relatively insensitive to the sampling phase.

Figure 12:
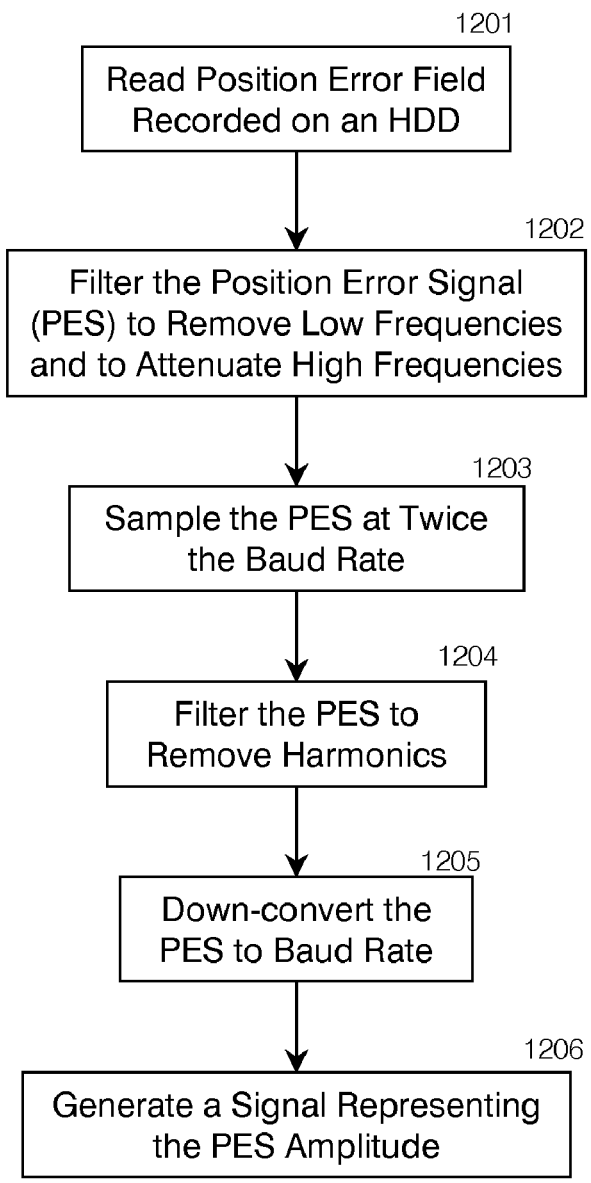
FIG. 12 is a flow chart showing the implementation of the inventive method and apparatus.

The above description describes individual circuitry to implement an apparatus to provide a signal for controlling the position of a transducing head across a rotating disk, the apparatus may be implemented for execution on a computational processor using the method described in FIG. 12. The apparatus reads the position error field previously recorded on a HDD 1201 and provides the PES to the processor. The processor filters the PES to remove low frequencies and to attenuate the high frequencies 1202. The processor then samples the PES at twice the baud rate 1203 and removes any higher order harmonic frequencies 1204. The sampled PES is then down converted to the baud rate. A discrete Fourier transform then provides a PES amplitude signal 1206 for controlling a position servo. The PES amplitude signal determines the direction and magnitude of any correctional movements needed to position the transducing head over the centerline of a data track.

Therefore, the foregoing is illustrative only of the principles of the invention. Further, those skilled in the art will recognize that numerous modifications and changes are possible. The disclosure of the foregoing embodiments does not limit the invention to the exact construction and operation shown. Accordingly, all suitable modifications and equivalents fall within the scope of the invention.

We claim:

1. An apparatus comprising:
    a continuous time filter (CTF) for receiving a substantially sinusoidal position error signal (PES) and transmitting a fundamental frequency while attenuating lower and higher frequencies of the PES to provide a filtered PES;
    an analog-to-digital converter (ADC) for sampling the filtered PES and providing a sampled PES;
    a digital filter, comprising a finite impulse response filter, for substantially eliminating a plurality of harmonic frequencies of the sampled PES; and
    a discrete Fourier transform (DFT) for providing an analog adjustment signal based on the filtered samples of the PES.

2. The apparatus of claim 1, wherein the ADC samples the PES at a second frequency.

3. The apparatus of claim 2, wherein the second frequency is twice the fundamental frequency.

4. The apparatus of claim 2, further comprising a down converter to restore the filtered samples of the PES to the fundamental frequency.

5. The apparatus of claim 1, wherein the DFT provides the analog adjustment signal for every four samples of the filtered samples of the PES.

6. The apparatus of claim 1, wherein the CTF is an analog filter.

7. The apparatus of claim 1, wherein said filter substantially eliminates a third harmonic frequency of the sampled PES.

8. A data recording disk drive system for providing an adjustment signal for positioning a transducing head in a hard disk drive (HDD), the system comprising:
    a disk having a surface for storing data thereon;
    at least one transducing head for reading position information recorded in data tracks on a storage medium and producing a substantially sinusoidal position error signal (PES);
    a servo actuator for positioning the at least one transducing head;
    a communications channel for transmitting data to and from the at least one head; and
    an apparatus according to claim 1.

9. The system of claim 8, wherein the ADC samples the filtered PES at a second frequency.

10. The system of claim 9, wherein the second frequency is twice the fundamental frequency.

11. The system of claim 9, further comprising a down converter to restore the filtered samples of the PES to the fundamental frequency.

12. The system of claim 8, wherein the DFT provides the analog adjustment signal for every four samples of the filtered samples of the PES.

13. The system of claim 8, wherein the CTF is an analog filter.

14. The system of claim 8, wherein said filter substantially eliminates a third harmonic frequency of the filtered samples of the PES.

15. An apparatus comprising:
    means for filtering a substantially sinusoidal position error signal (PES) to pass the fundamental frequency and to attenuate lower and higher frequencies of the PES to provide a filtered PES;
    means for sampling the filtered PES to provide a sampled PES;
    means, comprising a finite impulse response filtering means, for substantially eliminating a plurality of harmonic frequencies of the sampled PES; and
    means for receiving the filtered samples of the PES and for providing an analog adjustment signal for positioning the transducing head.

16. The apparatus of claim 15, wherein the sampling means samples the filtered PES at a second frequency.

17. The apparatus of claim 16, wherein the second frequency is twice the fundamental frequency.

18. The apparatus of claim 16, further comprising means for restoring the filtered samples of the PES to the fundamental frequency.

19. The apparatus of claim 15, wherein the means for providing the analog adjustment signal uses four samples of the filtered samples of the PES.

20. The apparatus of claim 15, wherein the means for filtering is an analog filtering means.

21. The apparatus of claim 15, wherein said means for attenuating substantially eliminates a third harmonic frequency of the sampled PES.

22. A data recording disk drive system for providing an adjustment signal for positioning a transducing head in a hard disk drive (HDD), wherein the transducing head reads position error information recorded on the HDD and produces a substantially sinusoidal position error signal (PES), the system comprising:
    means for storing data on the rotating disk;
    means for positioning the transducing head;
    means for transmitting data to and from the transducing head; and
    apparatus according to claim 15.

23. The system of claim 22, wherein the sampling means samples the PES at a second frequency.

24. The system of claim 23, wherein the second frequency is twice the fundamental frequency.

25. The system of claim 23, further comprising means to restore the filtered samples of the PES to the fundamental frequency.

26. The system of claim 22, wherein the means for providing the analog adjustment signal uses four samples of the sampled PES.

27. The system of claim 22, wherein the means for filtering is an analog filter.

28. The system of claim 22, wherein said means for attenuating substantially eliminates a third harmonic frequency of the sampled PES.

29. A method comprising:
   producing a sinusoidal position error signal (PES);
      digitally filtering the PES with a digital filter comprising a finite impulse response filter to pass a fundamental frequency and to attenuate the lower and higher frequencies of the PES to provide a filtered PES;
      sampling the filtered PES to provide a sampled PES;
      substantially eliminating a plurality of harmonic frequencies of the filtered samples of the PES; and
      providing an analog adjustment signal.

30. The method of claim 29, wherein sampling the filtered PES is at a second frequency.

31. The method of claim 30, wherein the second frequency is twice the fundamental frequency.

32. The method of claim 30, further comprising down converting the filtered samples of the PES to restore the fundamental frequency.

33. The method of claim 29, wherein the analog adjustment signal is provided for every four samples of the filtered samples of the PES.

34. The method of claim 29, wherein filtering the PES comprises analog filtering.

35. The method of claim 29, wherein said attenuating substantially eliminates a third harmonic frequency of the filtered samples of the PES.

* * * * *